United States Patent
Wojtecki

(10) Patent No.: US 11,647,768 B2
(45) Date of Patent: May 16, 2023

(54) PRETREATED CLAY COMPOSITION AND PROCESS FOR SELECTIVE REMOVAL OF PLANAR MOLECULES FROM SOLUTIONS

(71) Applicant: International Business Machines Corporation, Armonk, NY (US)

(72) Inventor: Rudy J. Wojtecki, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 314 days.

(21) Appl. No.: 17/095,211

(22) Filed: Nov. 11, 2020

(65) Prior Publication Data

US 2022/0142213 A1 May 12, 2022

(51) Int. Cl.
| | |
|---|---|
| *A23L 5/20* | (2016.01) |
| *B01J 20/12* | (2006.01) |
| *B01J 20/26* | (2006.01) |
| *A23F 5/22* | (2006.01) |
| *A23F 3/38* | (2006.01) |

(52) U.S. Cl.
CPC .............. *A23L 5/273* (2016.08); *A23F 3/385* (2013.01); *A23F 5/223* (2013.01); *B01J 20/12* (2013.01); *B01J 20/261* (2013.01); *B01J 20/262* (2013.01); *A23V 2002/00* (2013.01)

(58) Field of Classification Search
CPC ......... A23L 5/273; B01J 20/12; B01J 20/261; B01J 20/262; A23F 5/223; A23F 3/385
See application file for complete search history.

(56) References Cited

U.S. PATENT DOCUMENTS 5,028,338 A * 7/1991 Hooykaas ........... C04B 20/1022
210/691
5,457,272 A * 10/1995 Hooykaas ................ B01J 20/12
423/118.1

(Continued)

FOREIGN PATENT DOCUMENTS

CN          1883787      * 12/2006
CN        102391941      *  3/2012

(Continued)

OTHER PUBLICATIONS

Translation for JP2019068866 published May 2019.*

(Continued)

*Primary Examiner* — Anthony J Weier
(74) *Attorney, Agent, or Firm* — Kelsey M. Skodje

(57) ABSTRACT

A process of forming a treated clay composition, a process of decaffeination, and a treated clay composition are shown. The process of forming the treated clay composition includes providing a first solution of caffeine molecules and non-caffeine molecules, extracting the caffeine molecules to form a pretreatment solution, and bringing a clay composition into contact with the pretreatment solution to form the treated clay composition, on which at least one of the non-caffeine molecules is adsorbed. The process of decaffeination includes providing a solution of caffeine and non-caffeine molecules, and bringing the solution into contact with a treated clay composition. The treated clay composition includes organic molecules adsorbed on mineral layers of a clay. The organic molecules are non-caffeine molecules from a pretreatment solution.

20 Claims, 2 Drawing Sheets

(56) References Cited

U.S. PATENT DOCUMENTS

| | | | | |
|---|---|---|---|---|
| 5,728,764 | A | * | 3/1998 | Bauer .................... C09C 1/42 |
| | | | | 524/789 |
| 5,906,743 | A | | 5/1999 | Cohen et al. |
| 7,883,734 | B2 | | 2/2011 | Ogura et al. |
| 10,426,178 | B2 | | 10/2019 | Fischer et al. |
| 2001/0056136 | A1 | * | 12/2001 | Hasegawa ............... C08K 9/04 |
| | | | | 523/205 |
| 2002/0123575 | A1 | * | 9/2002 | Kato ........................ C08K 9/04 |
| | | | | 525/390 |
| 2002/0156171 | A1 | * | 10/2002 | Drewniak ............... C08L 23/10 |
| | | | | 523/351 |
| 2003/0027716 | A1 | * | 2/2003 | Sato ......................... C07C 2/32 |
| | | | | 502/103 |
| 2003/0102081 | A1 | * | 6/2003 | Hosokawa .............. C09J 11/04 |
| | | | | 156/289 |
| 2016/0262416 | A1 | | 9/2016 | Desobgo Nguepi et al. |
| 2019/0133153 | A1 | | 5/2019 | Liu et al. |
| 2020/0238251 | A1 | * | 7/2020 | Tamura .................. B01J 20/262 |

FOREIGN PATENT DOCUMENTS

| | | | |
|---|---|---|---|
| CN | 109152380 A | | 1/2019 |
| GB | 1255370 | * | 12/1971 |
| JP | 2004147508 A | | 5/2004 |
| JP | 2006174746 A | | 7/2006 |
| JP | 2017018013 A | | 1/2017 |
| JP | 2017153412 A | | 9/2017 |
| JP | 2019068866 | * | 5/2019 |
| JP | S393002 B1 | | 8/2019 |
| JP | 6734075 | * | 8/2020 |
| KR | 20160118824 | * | 10/2016 |
| WO | 20151385561 A1 | | 9/2015 |

OTHER PUBLICATIONS

Translation for JP6734075 published Aug. 2020.*
Translation for KR20160118824 published Oct. 2016.*
Translation for CN1883787 published Dec. 2006.*
Translation for CN102391941 published Mar. 2012.*
International Search Report and Written Opinion, International Application No. PCT/CN2021/123985, dated Jan. 13, 2022, 9 pgs.
Hosterman, J.W. and S.H. Patterson. 1992. "Bentonite and Fuller's earth resources of the United States," U.S. Geological Survey Professional Paper 1522. United States Government Printing Office, Washington D.C., USA. 50 pgs.
Kelessidis, V.C. "Yield Stress of Bentonite Dispersions," Rheology: open access (2017), 1(1),1-12.
Natkanski, P., et al., "The synthesis of poly(acrylic acid)-bentonite and polyacrylamide-bentonite composites for adsorption applications," Chemik (2012), 66(7), 742-749.
Shiono et al., "Caffeine adsorption of montmorillonite in coffee extracts", Bioscience, Biotechnology, and Agrochemistry, 2017, vol. 81, No. 8, pp. 1591-1597.

* cited by examiner

PRETREATED CLAY COMPOSITION AND PROCESS FOR SELECTIVE REMOVAL OF PLANAR MOLECULES FROM SOLUTIONS

BACKGROUND

The present disclosure relates to decaffeination and, more specifically, to selective decaffeination of solutions using a pretreated clay composition.

There are a variety of techniques for decaffeinating beverages such as coffee, teas (e.g., green, black, and white teas), and soft drinks. For example, caffeine can be extracted from coffee using solvents such as dichloromethane, ethyl acetate, chloroform, ethanol, acetone, etc. Other coffee decaffeination techniques include treatment of with supercritical $CO_2$, as well as the Swiss water process, in which caffeine is captured by charcoal filtration. Further, caffeine can be removed from beverages using food-compatible clays and clay/polymer composites. For example, bentonite and polymer composites thereof can trap planar molecules such as caffeine.

SUMMARY

Various embodiments are directed to a process of forming a treated clay composition, which includes providing a first solution of caffeine molecules and non-caffeine molecules. The non-caffeine molecules can include chlorogenic acid lactones and breakdown products thereof, phenols, polyphenols, lactones, tannins, and phenylindanes. The process also includes extracting the caffeine molecules from the first solution to form a pretreatment solution, and bringing a clay composition into contact with the pretreatment solution to form the treated clay composition, on which at least one of the non-caffeine molecules is adsorbed. The pretreatment solution can include the non-caffeine molecules. The clay composition can include a clay (e.g., bentonite, montmorillonite, and/or nontronite) and, in some embodiments, a hydrophilic polymer. The process can also include providing a second solution of caffeine and non-caffeine molecules, and extracting the caffeine molecules from the second solution by bringing it into contact with the treated clay composition. The first and second solutions can be coffee, tea, or soft drinks.

Additional embodiments are directed to a process of decaffeination that includes providing a solution of caffeine and non-caffeine molecules (e.g., chlorogenic acid lactones, phenols, polyphenols, lactones, tannins, and phenylindanes), and selectively adsorbing the caffeine molecules onto a treated clay composition. The solution can be coffee, tea, or a soft drink. The treated clay composition includes organic molecules (e.g., chlorogenic acid lactones, phenols, polyphenols, lactones, tannins, and phenylindanes) adsorbed on a clay (e.g., a bentonite, montmorillonite, and/or nontronite clay). The clay can be housed by a polymer.

Further embodiments are directed to a treated clay composition that includes a clay having mineral layers and organic molecules adsorbed on the mineral layers. The mineral layers can include montmorillonite layers. The treated clay composition can also include a polymer (e.g., poly(acrylic acid), polyvinyl alcohol, polyethylene glycol, polyacrylamide, etc.). The organic molecules are non-caffeine molecules from a pretreatment solution. These molecules can include chlorogenic acid lactones, phenols, polyphenols, lactones, tannins, and phenylindanes.

DETAILED DESCRIPTION

Figure 1:
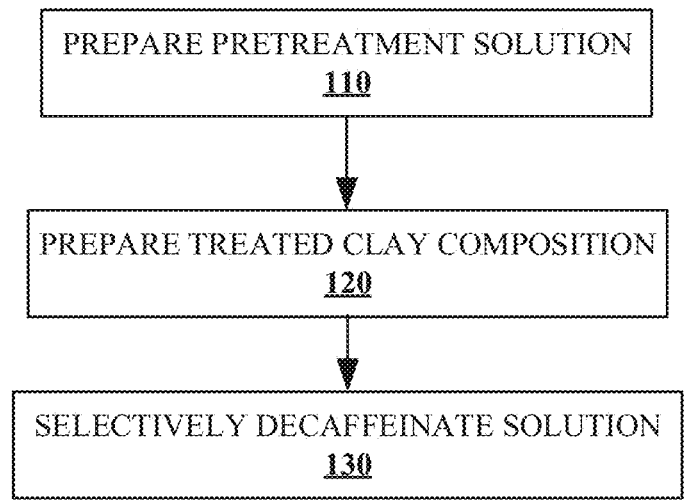
FIG. 1 is a flow diagram illustrating a decaffeination process, according to some embodiments of the present disclosure.

Decaffeination of beverages made from natural caffeine sources, such as coffee beans and tea leaves, requires extraction of caffeine. Caffeine can be extracted from green (unroasted) coffee beans or roasted coffee beans using various techniques. For example, in a technique known as the Swiss water process, green coffee beans are soaked in hot water, which is then passed through a charcoal filter having pores that can trap caffeine molecules. Caffeine can also be extracted from water-soaked coffee beans by treatment with supercritical carbon dioxide ($sCO_2$).

Additionally, absorbent clays such as bentonite can be used to extract caffeine from solutions. Bentonite is a clay that is composed primarily of montmorillonite, although other smectite minerals, such as nontronite, hectorite, saponite, and beidelite, can be present as well. Bentonite can also contain variable amounts of other minerals such as quartz, feldspar, calcite, and gypsum. Bentonite has a nanoscale layered structure. For example, a bentonite layer can have an area of about 100 $nm^2$ and a thickness of about 1 nm. Aggregates of these layers form micro- to millimeter scale particles. The layers are held together primarily by van der Waals and electrostatic forces.

Each of these layers can have an octahedral sheet between two tetrahedral sheets. The octahedral sheets can contain aluminum, magnesium, and/or iron cations. Each cation is surrounded by oxygen atoms and hydroxyl ions shared by the octahedral unit cells. The tetrahedral sheets can be silica sheets with unit cell formulas of $Si_2O_5$. The primary component of bentonite, montmorillonite, has the formula $(Al, Mg)_8(Si_4O_{10})_4(OH)_8 \cdot 12H_2O$. Water molecules and exchangeable cations (e.g., sodium and calcium cations) can travel between the layers, causing separation of the layers and swelling of the particles. Organic molecules can enter the spaces between the layers, and adsorb on the large planar surfaces of the mineral sheets. Caffeine can therefore be extracted from solutions mixed with bentonite due to its adsorption on the layer surfaces.

However, other molecules can be adsorbed on the bentonite layers as well. This includes a variety of planar and aromatic non-caffeine compounds. Therefore, when bentonite is used to remove caffeine from coffee, compounds that provide other characteristics (e.g., flavor, color, and aroma) can also be removed. This can include compounds such as chlorogenic acid lactones and their breakdown products (e.g., phenylindanes). Additionally, there is evidence that phenylindanes and other compounds present in coffee can provide physiological benefits when ingested. Therefore, techniques for more selectively removing caffeine from coffee are needed in order to avoid adversely affecting its quality by removing other components during decaffeination.

Disclosed herein are techniques for selectively removing caffeine from solutions (e.g., beverages) using a treated clay composition. The clay composition includes an absorbent clay such as bentonite, montmorillonite, and/or nontronite. The clay composition can also be a clay/polymer composite in which the absorbent clay is housed within a hydrophilic polymer such as poly(acrylic acid), polyvinyl alcohol, polyethylene glycol, or polyacrylamide. The treatment process includes adding the clay composition to a pretreatment solution, which contains non-caffeine molecules typically found in a solution that is to be decaffeinated, such as coffee, tea, and soft drinks. Examples of these compounds can include phenols, polyphenols, lactones, tannins, phenylindanes, and other aromatic hydrocarbons. The non-caffeine molecules in this solution can adsorb on the clay composition layers, producing a clay composition with reduced affinity for the adsorbed non-caffeine compounds. This treated clay composition can be added to another solution containing both caffeine and non-caffeine molecules in order to preferentially remove the caffeine.

FIG. 1 is a flow diagram illustrating a decaffeination process 100, according to some embodiments of the present disclosure. A pretreatment solution is prepared. This is illustrated at operation 110. The pretreatment solution can be prepared from a first solution containing caffeine and non-caffeine molecules. The first solution can be a beverage containing caffeine, such as coffee, tea, or a soft drink. For example, a first coffee solution can be prepared by extraction, wherein hot water is poured over roasted, ground coffee beans. In some embodiments, extraction of the coffee solution may also be carried out with roasted whole beans or unroasted beans. These extraction techniques can also be used to prepare a first tea solution. The coffee solution can also be prepared by dissolving soluble ("instant") coffee in water. In some embodiments, the caffeine concentration in the first solution is approximately 20 kg/m$^3$-50 kg/m$^3$. However, solutions having other caffeine concentrations can be used (e.g., ~0.2 kg/m$^3$-5 kg/m$^3$, ~5 kg/m$^3$-20 kg/m$^3$, ~50 kg/m$^3$-100 kg/m$^3$, etc.).

An amount of clay composition is brought into contact with the first solution. In some embodiments, the amount of clay composition is about 100 kg/m$^3$, although other amounts of clay composition can be used (e.g., about 50 kg/m$^3$-100 kg/m$^3$, about 100 kg/m$^3$-150 kg/m$^3$, etc.). This can be carried out at room temperature, although other solution temperatures can be used as well (e.g., about 50-200° C.). In some embodiments, the clay composition is bentonite or a bentonite/polymer composite (e.g., poly (acrylic acid)-bentonite, polyvinyl alcohol-bentonite, polyethylene glycol-bentonite, polyacrylamide-bentonite, etc.). However, other clay compositions can be used, such as montmorillonite, nontronite, or clay/polymer composites thereof. In some embodiments, the clay composition and first solution are combined and allowed to remain in contact in a container for about 1 min-5 min. The first solution and clay composition may be mixed via stirring, shaking, or otherwise agitating. Longer contact times may be necessary for large volumes of solution (e.g., greater than about 1 L). In other embodiments, the first solution can be passed through a filtration column containing clay/polymer composite particles. Clay/polymer composites having non-particle structures may be used as well (e.g., porous clay/polymer composite materials).

Caffeine and a portion of non-caffeine molecules in the first solution are adsorbed onto the clay composition, resulting in a decaffeinated solution. A portion (e.g., about 50-90%) of the non-caffeine molecules remain in the decaffeinated solution. The clay composition is then separated from the decaffeinated first solution. The remaining solution is referred to herein as the pretreatment solution. For example, the clay composition can be filtered out of the solution via at least one filtration step. Centrifugation can also be used to remove the clay composition from the solution (e.g., prior to filtration). When column filtration with a clay/polymer composite is used, the pretreatment solution is collected from the column.

Removal of non-caffeine molecules from the first solution can be measured via nuclear magnetic resonance (NMR) spectroscopy (e.g., proton and/or carbon-13 NMR) by observing signals at chemical shifts characteristic of aromatic molecules other than caffeine. In an example involving a first coffee solution and corresponding pretreatment solution, a proton NMR spectrum of the pretreatment solution may show about 97-98% reduction in signal intensity of a peak characteristic of caffeine (e.g., at about 7.5 ppm) and about 50% reduction in signal intensity of a non-caffeine aromatic peak at about 8.01 ppm and/or ~4.0-4.2 ppm. Other techniques for measuring quantities of organic molecules in solution (e.g., gas chromatography-mass spectrometry) can be used as well. Removal of non-caffeine molecules can also be indicated by color changes. For example, the color of the clay composition can darken when chromophoric non-caffeine molecules (e.g., from coffee or black tea) are adsorbed on its layers.

In other embodiments, pretreatment solutions may be prepared directly at operation 110 by dissolving desired non-caffeine molecules. This can include non-caffeine molecules known to be partially extracted from beverages during clay composition decaffeination. For example, the pretreatment solution may be prepared by providing a solution of molecules commonly adsorbed on bentonite during coffee decaffeination, such as phenols, polyphenols, lactones, tannins, phenylindanes, and/or other aromatic hydrocarbons.

A treated clay composition is then prepared. This is illustrated at operation 120. In some embodiments, an amount of untreated clay composition (e.g., bentonite, montmorillonite, and/or nontronite) is mixed with the pretreatment solution. In other embodiments, a clay/polymer composite is combined with the pretreatment solution via mixing or column filtration. The addition and mixing of the untreated clay composition with the pretreatment solution can be carried out using techniques substantially similar to those used for mixing the clay composition and first solution at operation 110. Organic molecules from the decaffeinated pretreatment solution adsorb on the clay composition layers. The resulting treated clay composition therefore has a reduced affinity for the adsorbed non-caffeine molecules. The treated clay composition is removed from the pretreatment solution (e.g., via filtration and/or centrifugation). The treated clay composition can optionally be dried after its removal from the pretreatment solution (e.g., via heating, evaporation under ambient conditions, evaporation under reduced pressure, addition of a drying agent, etc.).

The treated clay composition is used for selective decaffeination of a second solution. This is illustrated at operation 130. The second solution can be a coffee solution (e.g., a coffee solution substantially similar to the first coffee solution prior to the addition of untreated bentonite at operation 110). However, other solutions (e.g., tea or soft drinks) can be decaffeinated by the treated bentonite in some embodiments. This is discussed in greater detail above. The addition and mixing of the treated clay composition with the second solution can be carried out using techniques substantially similar to those used for mixing the untreated clay composition and the first solution.

The treated clay composition includes adsorbed non-caffeine molecules present in the first solution. These non-caffeine molecules include compounds that contribute to the first solution's qualitative features such as taste, aroma, appearance, etc. Examples of these compounds are discussed in greater detail above. The treated clay composition has a reduced affinity for the compounds already adsorbed. Because the pretreatment solution is decaffeinated, the treated clay composition does not adsorb caffeine molecules in anything more than trace amounts. Therefore, the treated and untreated clay composition compositions do not have substantially different affinities for caffeine. This allows the treated clay composition to preferentially remove caffeine from the second solution. Continuing the NMR example above, selective decaffeination can be observed by comparing proton NMR spectra of a coffee solution and a coffee solution decaffeinated by the treated clay composition. The decaffeinated coffee solution may show 97-98% reduction in signal intensity of the caffeine peak at about 7.5 ppm and less than 50% reduction in signal intensity of the aromatic peaks at 8.01 ppm and about 4.0-4.2 ppm (e.g., 0-10% signal intensity reduction).

In some embodiments, operation 130 can be carried out on an industrial scale, such as in the preparation of decaffeinated brewed coffee or decaffeinated instant coffee granules. In other embodiments, the treated clay composition can be provided to consumers who can then decaffeinate a beverage of their choice by mixing the beverage with the treated clay composition, and then filtering the mixture to remove the clay composition and adsorbed caffeine.

Figure 2A:
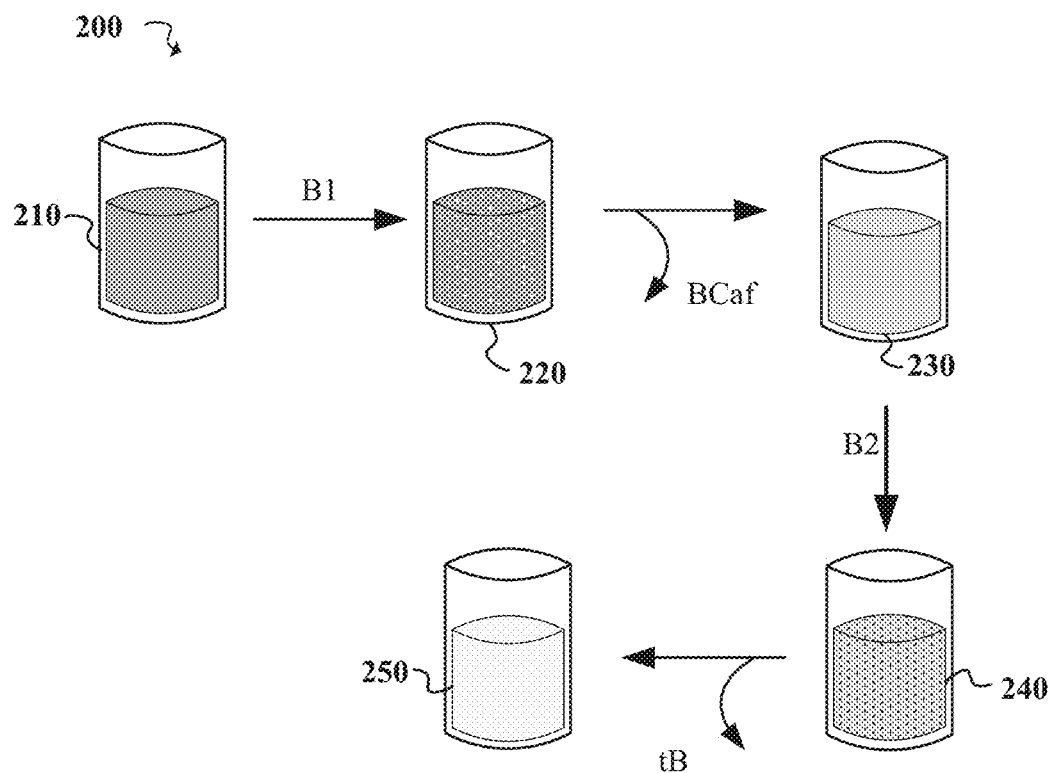
FIG. 2A is a schematic diagram illustrating a process of forming a treated bentonite composition, according to some embodiments of the present disclosure.

FIG. 2A is a schematic diagram illustrating a process 200 of preparing a treated bentonite composition, according to some embodiments of the present disclosure. To illustrate process 200, but not to limit embodiments, FIG. 2A is described within the context of process 100, illustrated in FIG. 1. Where elements referred to in FIG. 2A are identical to elements shown in FIG. 1, the same reference numbers are used in both Figures.

A coffee solution 210 is provided, and mixed with a first portion of untreated bentonite (B1) to form a decaffeination mixture 220. Caffeine molecules are adsorbed on the surface of the bentonite in this mixture 220 to form a bentonite/caffeine composition (BCaf). For example, about 90-100% of the caffeine molecules in the decaffeination mixture 220 can be adsorbed on the bentonite. A portion (e.g., about 10-50%) of non-caffeine molecules in the mixture 220 can be adsorbed on the surface of the BCaf as well.

The B-Caf is removed from the mixture 220 (e.g., by filtration) to form a pretreatment solution 230. Techniques for preparing the pretreatment solution 230 from a first coffee solution are discussed in greater detail with respect to operation 110 of process 100 (FIG. 1). In FIG. 2A, the pretreatment solution 230 is a lighter color than the coffee solution 210 and decaffeination mixture 220. This is intended to represent the removal of chromophoric non-caffeine molecules adsorbed on B-Caf. However, this is for illustrative purposes, and in some embodiments the appearance of the pretreatment solution 230 is substantially the same as that of the coffee solution 210.

A second portion of untreated bentonite (B2) is provided. This untreated bentonite is added to the pretreatment solution 230 to form a treatment mixture 240. Non-caffeine molecules present in the treatment mixture 240 adsorb on the untreated bentonite. The quantity of non-caffeine molecules that adsorb on the bentonite can depend, at least in part, on the concentration of molecules and the amount of bentonite in the treatment mixture 240. The adsorption amount can also depend on parameters such as mixing time and temperature. The bentonite with adsorbed non-caffeine molecules is referred to herein as treated bentonite (tB).

The treated bentonite is then separated from the mixture 240. The treated bentonite can optionally be dried after it is removed from the mixture 240. Preparation of treated bentonite is discussed in greater detail with respect to operation 120 of process 100 (FIG. 1). The remaining solution 250 can be discarded in some embodiments. In other embodiments (not shown), the remaining solution can be mixed with a next portion of treated or untreated bentonite in order to extract additional non-caffeine molecules remaining in the solution 250.

Figure 2B:
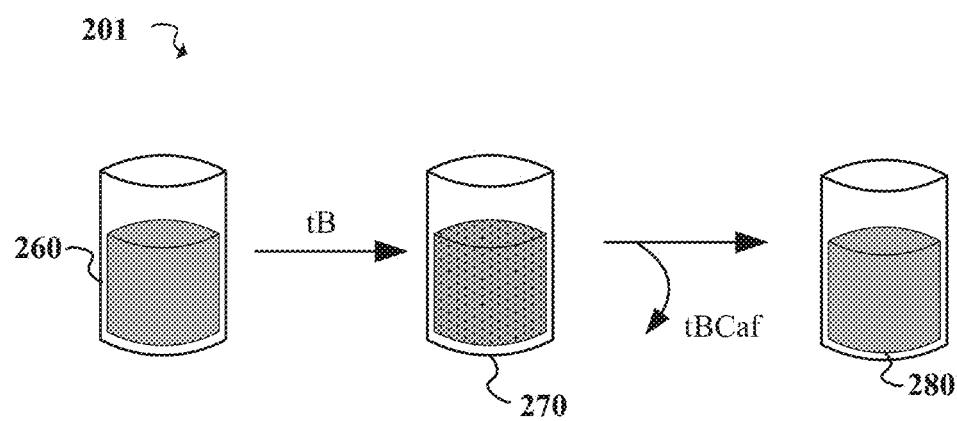
FIG. 2B is a schematic diagram illustrating a process of selective decaffeination, according to some embodiments of the present disclosure.

FIG. 2B is a schematic diagram illustrating a process 201 of preparing a selectively decaffeinated coffee solution, according to some embodiments of the present disclosure. To illustrate process 201, but not to limit embodiments, FIG. 2B is described within the context of processes 100 and 200, respectively illustrated in FIGS. 1 and 2A. Where elements referred to in FIG. 2B are identical to elements shown in FIGS. 1 and 2A, the same reference numbers are used in both Figures.

A second coffee solution 260 is provided. This coffee solution 260 can be substantially similar to the coffee solution 210 illustrated in FIG. 2A. However, any type of coffee solution can be used. Treated bentonite (tB) is added to the coffee solution 260 to form a selective decaffeination mixture 270. Preparation of the treated bentonite is discussed in greater detail with respect to FIG. 2A and operation 120 of process 100 (FIG. 1). The mixing conditions (e.g., time, temperature, amount of bentonite, etc.) of process 201 can be substantially similar to those of mixtures 220 and/or 240 (process 200). However, various mixing and/or column filtration conditions can be used in some embodiments. This is discussed in greater detail with respect to FIG. 1.

Caffeine molecules adsorb on the surface of the treated bentonite in the selective decaffeination mixture 270 to form a treated bentonite/caffeine composition (tBCaf). For example, about 90-100% of the caffeine molecules in the selective decaffeination mixture 270 can be adsorbed on the treated bentonite. While there can be non-caffeine molecules adsorbed on tBCaf as well, the quantity of non-caffeine molecules adsorbed on tBCaf is lower than the portion of non-caffeine molecules adsorbed on untreated bentonite under similar conditions (e.g., concentration of coffee solution 260, bentonite to solution ratio, temperature, mixing time, etc.). This is because the treated bentonite has a reduced affinity for non-caffeine molecules present in coffee, relative to untreated bentonite. In some embodiments, about 0-10% of the non-caffeine molecules adsorb on the treated bentonite, though other amounts can be adsorbed as well (e.g. about 0-5%, 10-15%, 15-20%, etc.).

The tBCaf composition is removed from the selective decaffeination mixture 270 via filtration. In some embodiments, centrifugation can be used to separate the tBCaf from the mixture 270. This can be followed by filtration. Further, in some embodiments more than one filtration step is carried out to remove the tBCaf from the mixture. Removal of the tBCaf from the mixture 270 yields a decaffeinated coffee solution 280, which can be consumed or dried to form soluble coffee granules. The decaffeinated coffee solution 280 can be qualitatively more similar to the coffee solution 260 than a decaffeinated coffee solution prepared using untreated bentonite. This is because the preferential adsorption of caffeine molecules on the treated bentonite leaves behind non-caffeine molecules responsible for features of coffee such as its taste, appearance, aroma, and other physiological effects. Techniques for preparing the selectively decaffeinated coffee solution 280 are discussed in greater detail with respect to operation 130 of process 100 (FIG. 1).

Processes 200 and 201 can be carried out with beverages other than coffee, and can involve clay compositions other than treated bentonite or bentonite/polymer composites. For example, a tea pretreatment solution can be prepared, followed by tea-treated bentonite, in process 200. A tea solution can then be selectively decaffeinated with the tea-treated bentonite in process 201. Additionally, montmorillonite clay, nontronite, other smectite clays, and polymer composites thereof can be used in place of, or in addition to, bentonite or bentonite/polymer composites. Solutions that can be decaffeinated and clay compositions that can be treated are discussed in greater detail with respect to FIG. 1.

Unless otherwise noted, processes (e.g., mixing, filtration, etc.) are performed at ambient conditions or under slight heating with no special atmosphere or head space, and standard procedures for solvent removal and purification are performed. Room temperature can be between about 15° C. and 30° C. Unless otherwise indicated, modifying terms such as "about," "approximately," and "~" indicate +/−10% of a recited value, range of values, or endpoints of one or more ranges of values. Ranges (e.g., time, concentration, temperature, etc.) indicated herein include both endpoints and all numbers between the endpoints. Unless specified otherwise, the use of "about," "approximately," or a tilde (~) in connection with a range applies to both ends of the range (e.g., "approximately 1 g-5 g" should be interpreted as "approximately 1 g-approximately 5 g"), and in connection with a list of ranges applies to each range in the list (e.g., "about 1 g-5 g, 5 g-10 g, etc." should be interpreted as "about 1 g-about 5 g, about 5 g-about 10 g, etc.").

The processes discussed herein, and their accompanying drawings, are not to be construed as limiting. One skilled in the art would recognize that a variety of techniques may be used that vary in conditions, components, methods, etc., which ultimately generate treated bentonite for selective decaffeination. In addition, the conditions can optionally be changed over the course of a process. Further, in some embodiments processes can be added, omitted, or carried out in alternate orders, while still remaining within the scope of the disclosure, as will be understood by a person of ordinary skill in the art. It should also be noted that processes can be carried out by a single entity, or by multiple entities. For example, a first entity may prepare the treated bentonite, and a second entity may prepare the selectively decaffeinated solution.

The molecular compounds described herein can contain one or more chiral centers. Unless otherwise noted, the disclosed structures cover all stereoisomers, conformers, rotamers, isomers, and enantiomers of the represented compounds. Further, polymers or other materials containing the disclosed compounds can include racemic forms of the compounds in addition to individual stereoisomers, as well as mixtures containing any of these. Substituents on the compounds described herein may participate in additional chemical reactions, transformations, or interactions, which can include synthesis, decomposition, single and/or double replacement, oxidation/reduction, acid/base, nucleophilic, electrophilic and radical substitutions, addition/elimination reactions, crosslinking reactions, and polymerization reactions.

Where isomers of a named alkyl, alkenyl, alkoxy, aryl, or other functional group exist (e.g., n-butyl, iso-butyl, sec-butyl, and tert-butyl), reference to a member of the group without specifying a particular isomer (e.g., butyl) is intended to include all isomers in the family (e.g., n-butyl, iso-butyl, sec-butyl, and tert-butyl). Further, unless specified otherwise, reference to one member of the group (e.g., n-butyl) includes the remaining isomers in the family (e.g., iso-butyl, sec-butyl, and tert-butyl).

What is claimed is:

1. A process of forming a treated clay composition, comprising:
    providing a first solution, comprising:
        caffeine molecules; and
        non-caffeine molecules;
    extracting the caffeine molecules from the first solution to form a pretreatment solution; and
    bringing a clay composition into contact with the pretreatment solution to form the treated clay composition, wherein at least one of the non-caffeine molecules is adsorbed on the treated clay composition.

2. The process of claim 1, wherein the pretreatment solution comprises the non-caffeine molecules.

3. The process of claim 1, wherein the clay composition comprises a clay selected from the group consisting of bentonite, montmorillonite, and nontronite.

4. The process of claim 3, wherein the clay composition further comprises a hydrophilic polymer.

5. The process of claim 1, wherein the non-caffeine molecules comprise breakdown products of chlorogenic acid lactones.

6. The process of claim 1, wherein the non-caffeine molecules comprise at least one molecule selected from the group consisting of chlorogenic acid lactones, phenols, polyphenols, lactones, tannins, and phenylindanes.

7. The process of claim 1, further comprising:
    providing a second solution, the second solution comprising:
        caffeine molecules; and
        non-caffeine molecules; and
    extracting the caffeine molecules from the second solution by bringing the second solution into contact with the treated clay composition.

8. The process of claim 7, wherein the first solution and the second solution are selected from the group consisting of coffee, tea, and soft drinks.

9. A process of decaffeination, comprising:
    forming a treated clay composition, the forming comprising:
        providing a solution comprising caffeine molecules and non-caffeine molecules;
        extracting the caffeine molecules from the solution to form a pretreatment solution comprising the non-caffeine molecules; and
        treating a clay with the pretreatment solution, wherein the treating causes adsorption of the non-caffeine molecules onto the clay;
    providing a caffeinated solution; and
    bringing the caffeinated solution into contact with the treated clay composition.

10. The process of claim 9, wherein the caffeinated solution is selected from the group consisting of coffee, tea, and soft drinks.

11. The process of claim 9, wherein the non-caffeine molecules include at least one molecule selected from the group consisting of chlorogenic acid lactones, phenols, polyphenols, lactones, tannins, and phenylindanes.

12. The process of claim 9, wherein the caffeinated solution comprises at least one molecule selected from the group consisting of chlorogenic acid lactones, phenols, polyphenols, lactones, tannins, and phenylindanes.

13. The process of claim 9, wherein the clay is selected from the group consisting of bentonite, montmorillonite, and nontronite.

14. The process of claim 9, wherein the treated clay composition further comprises a polymer.

15. The process of claim 9, wherein the clay has a layered structure.

16. A treated clay composition, comprising:
   a clay comprising mineral layers; and
   organic molecules adsorbed on the mineral layers, wherein the organic molecules comprise non-caffeine molecules and are adsorbed in a process comprising:
      providing a first solution comprising caffeine molecules and the non-caffeine molecules;
      extracting the caffeine molecules from the first solution to form a pretreatment solution; and
      bringing the clay into contact with the pretreatment solution.

17. The treated clay composition of claim 16, wherein the organic molecules comprise at least one molecule selected from the group consisting of chlorogenic acid lactones, phenols, polyphenols, lactones, tannins, and phenylindanes.

18. The treated clay composition of claim 16, wherein the mineral layers comprise montmorillonite layers.

19. The treated clay composition of claim 16, further comprising a polymer.

20. The treated clay composition of claim 19, wherein the polymer is selected from the group consisting of poly (acrylic acid), polyvinyl alcohol, polyethylene glycol, and polyacrylamide.

* * * * *